United States Patent [19]

Ootsuka et al.

[11] E Patent Number: Re. 33,457

[45] Reissued Date of Patent: Nov. 27, 1990

[54] SWITCH

[75] Inventors: Shigeharu Ootsuka, Kakamigahara; Yuji Mizuno, Nagoya, both of Japan

[73] Assignee: Mitsubishi Denki Kabushiki Kaisha, Japan

[21] Appl. No.: 296,141

[22] Filed: Jan. 12, 1989

Related U.S. Patent Documents

Reissue of:

[64] Patent No.: 4,650,935
Issued: Mar. 17, 1987
Appl. No.: 810,714
Filed: Dec. 19, 1985

[30] Foreign Application Priority Data

Dec. 25, 1984 [JP] Japan ..... 59-271768

[51] Int. Cl.[5] ..... H01H 1/06; H01H 15/06

[52] U.S. Cl. ..... 200/16 A; 200/240; 200/241; 200/243; 200/279

[58] Field of Search ..... 200/16 A, 240–243, 200/279; 335/131

[56] References Cited

U.S. PATENT DOCUMENTS

| | | | |
|---|---|---|---|
| 2,390,344 | 12/1945 | Ayers et al. | 200/16 A |
| 2,490,020 | 12/1949 | Enzler | 200/242 X |
| 2,712,580 | 7/1955 | Nickell et al. | 200/243 |
| 2,758,169 | 8/1956 | Weide | 200/16 A X |
| 2,879,359 | 3/1959 | Pearson | 200/241 X |
| 3,099,728 | 7/1963 | Scheib, Jr. | 335/131 |
| 3,188,405 | 6/1965 | Scheib, Jr. | 200/16 A |
| 3,320,392 | 5/1967 | Mullen et al. | 200/243 |
| 4,277,662 | 7/1981 | Lewandowski | 200/242 |
| 4,565,986 | 1/1986 | Otsuka et al. | 335/131 |
| 4,565,987 | 1/1986 | Otsuka et al. | 335/131 |
| 4,634,819 | 1/1987 | Ikeda | 200/16 A |

FOREIGN PATENT DOCUMENTS

| | | | |
|---|---|---|---|
| 224193 | 11/1962 | Austria | 200/16 A |
| 1160431 | 7/1958 | France | 200/16 A |
| 2504311 | 10/1982 | France . | |
| 602365 | 5/1948 | United Kingdom . | |
| 1284954 | 2/1972 | United Kingdom . | |

*Primary Examiner*—J. R. Scott
*Attorney, Agent, or Firm*—Leydig, Voit & Mayer

[57] ABSTRACT

A contactor, relay, or other switch has stationary contacts and a movable crossbar which carries a movable contact member provided with movable contacts. The contact member has lost motion relative to the crossbar and is resiliently biased by a spring so that the crossbar can continue to move after the contacts have met the stationary contacts. The crossbar has oblique guide grooves engaging the contact member so that, during the further movement of the crossbar, the contact member is caused to move longitudinally while the movable and stationary contacts touch, thus producing a contact wiping action due to sliding of the contacts. The contact member also has an asymmetical cross section comprising a projection where, when the contacts are open, it touches the crossbar so that, in this condition, the contact member is laterally tilted. When the movable contacts meet the stationary contacts and the crossbar continues to move, the contact member rotates from its tilted position under the action of the spring, causing the movable contacts to turn on the stationary contacts, thus producing a rotary wiping action, When the contacts are opened, similar double wiping action occurs in reverse. The rotary wiping action is in a curved path generally perpendicular to the straight path of the wiping action due to sliding of the contacts.

8 Claims, 5 Drawing Sheets

SWITCH

Matter enclosed in heavy brackets [ ] appears in the original patent but forms no part of this reissue specification; matter printed in italics indicates the additions made by reissue.

BACKGROUND OF THE INVENTION

This invention relates to electrical circuit switching devices, particularly but not exclusively for contactors, relays and the like.

The switching of the circuits of electric motors and other loads is commonly performed by switching devices such as electromagnetic contactors, electromagnetic relays, etc. A common problem in such devices is contact fouling. Measures are therefore usually taken to reduce fouling, in particular by providing for a mechanical wiping action of the contacts during operation of the switching device for switching the load circuit.

One conventional switching device is illustrated by FIG. 13 of the accompanying drawings, which shows an exploded view in perspective of a contactor.

The illustrated device has a moulded plastics base 10 onto which is fastened a moulded plastics body 16. The body is attached to the base in any convenient way, for example by means of screws. A stationary core 14 and an associated energizing coil 12 are seated in the base 10.

A movable cross bar 18 is disposed in the body 16 and can slide in the body towards and away from the base 10. A U-shaped movable core 20 is disposed inside the body, with its limbs facing the ends of the stationary core 14. The cross piece of the movable core 20 is located in a recess in the cross bar 18, by means of a spring clip 22 which extends through the movable core and of which the ends engage recesses in the cross bar. The core 20 and cross bar 18 therefore move with one another towards or away from the stationary core 14 according to whether the coil 12 is energizing or not.

One or more springs 24 seated between the cross bar 18 and the base 10 urge the cross bar away from the base, so that normally, when the coil 12 is not energized, the movable core 20 and cross bar 18 are held away from the stationary core 14.

When the coil 12 is energized, the movable core 20 is pulled towards the stationary core 14, thereby moving the cross bar 18 towards the base 10.

The body 16 is provided with stationary contacts connected to terminals for connection of external cables, and the cross bar 18 is provided with corresponding contacts, so that the movement of the cross bar openings and closes the switch.

In the illustrated example, a stationary contact member 28 with a stationary contact 26 is fixed to the body 16.

The cross bar 18 is provided with a contact bar 32 which is mounted so that it can slide in an opening 18a provided in the cross bar 18, and a spring 30 urges the contact bar 32 towards one end or bottom surface 33 of the opening 18a, namely the end or bottom surface 33 closer to the base 10 (see FIG. 11). On the side of the contact bar 32 that faces the base 10, contacts 34 are provided at both ends of the contact bar 32. The contacts 34 face respective contacts 26. Therefore, if the cross bar 18 and with it, the contact bar 32, are moved by the core 20 towards the base 10, the movable contacts 34 meet the stationary contacts 26, and the switch is closed. When the coil 12 is de-energized, springs 24 move the cross bar 18 away from the base 10, carrying the contacts 34 out of contact with the contacts 26. The spring 30 allows the contact bar 32 to 'float' and provides contact pressure to ensure good contact between the contacts 34, 26.

A removable arc cover 36 is fitted on the body 16 to constrain the arc formed when the contacts make or break contact, and to prevent damage due to arc heat.

In this device, an oxidized layer may form on the mating surfaces of the contact 26, 34, and/or dust may adhere to the contact surfaces. During switching, the movable contact bar 32 always remain parallel to its initial position and moves in a direction perpendicular to its length, so that the contacts 34 only move directly toward and away from the contacts 26. Thus there is no wiping action at the contact faces, and any oxidized layer or dust remain on the contacts. The performance of the contacts therefore deteriorates because the contact resistance between the contacts 26, 34 increases due to the oxidized layer and/or dust, and arcing may be enhanced, with pitting of the contacts. Operational reliability therefore deteriorates.

To induce a wiping action for cleaning the contact surfaces, FIG. 15 shows a projection 37 disposed on one side of the contact bar 32, so that when the contact bar 32 is in contact with the surface 33 of the cross bar at the end of the opening 18a, the contact bar 32 tilts sideways about the projection 37. Consequently, when the cross bar is moved so as to bring the contacts 34 into initial contact with the contacts 26, the contact bar 32 will tilt about the projection 37, thereby rocking the contacts 34 on the contacts 26, so as to wipe the contact surfaces. The reverse sequence of events provides a wiping action also when the contacts 34 are moved away from the contacts 26.

However, this construction has the disadvantage that the raw material is not effectively used when the contact bar 32 is manufactured, and the contact bar is relatively weak. The contact bar and the cross bar wear out quickly, because the projection 37 presses and rocks on a very small area of the cross bar, and the projection 37 is sharp. The performance of the switch therefore deteriorates, albeit a relatively long period in most cases.

SUMMARY OF THE INVENTION

An object of the present invention is to overcome the described disadvantages, and to provide a switch which is efficient and reliable in operation over a long time.

The present invention in one aspect resides in a switching device comprising a movable cross bar, a movable contact member provided with movable contacts and arranged to slide in an opening formed in the cross bar, a stationary contact member provided with stationary contacts disposed opposite the movable contacts, and a projection on the center part of the movable contact member, having a lateral offset from the center line of the movable contact member, said opening having therein an oblique slide surface engaged by the said projection.

In another aspect the present invention resides in a switch comprising stationary contacts, movable contacts provided on a movable contact member and facing respective stationary contacts, a movable support for the movable contact member, and actuating means for moving the support in opposite directions to move the movable contact member towards and away from the stationary contacts for closing and opening the contacts; and in which the movable contact member is mounted in the support with lost motion and is resiliently biased relative to the support towards the stationary contacts and towards an abutment surface of the support whereby on movement of the support towards the stationary contacts from the open position the movable contacts engage the stationary contacts and on further movement of the support the movable contacts rest on the stationary contacts and the said abutment surface moves clear of the movable contact member; and in which the movable contact member has, between the movable contacts, an asymmetrical transverse cross section whereby when in engagement with the abutment surface the contact member is laterally tilted relative to its position when held clear of the abutment surface, so that when the movable contacts are engaged with or disengaged from the stationary contacts, the movable contact member rotates to wipe the movable contacts on the stationary contacts; and the movable contact member is in engagement with a guide provided on the support which guide extends obliquely relative to the direction of movement of the support, so that when the support moves relative to the movable contact member, with the latter in the closed-contacts position, the guide will cause the movable contacts to slide on the stationary contacts.

In a switch embodying the invention, when the movable contacts move into or out of contact with the stationary contacts, the movable contacts pivot on the stationary contacts as the projection of the movable contact member engages or disengages from the cross bar, and additionally, the movable contacts slide on the stationary contacts, as a result of the oblique movement of the movable contact member induced by the oblique surface provided in the opening housing the movable contact member, which introduces a transverse component of movement as the movable contact member moves along the opening.

By virtue of these wiping actions, any oxidized layer formed on the surfaces of the contacts, or dust adhering to the surfaces of the contacts, is very effectively removed from both the fixed and the movable contacts.

At least one of the movable and stationary contacts preferably has a groove in its surface, to accentuate the wiping effect and to enable oxide or dust removed from the surfaces of the contacts, to be carried away by means of a groove or grooves. The wiping groove or grooves preferably extend obliquely relative to the center line of the movable contact member, for example at about 45° to it.

BRIEF DESCRIPTION OF THE DRAWINGS

The invention will be further described with reference to the accompanying drawings, in which.

DESCRIPTION OF THE PREFERRED EMBODIMENTS

Figure 13:
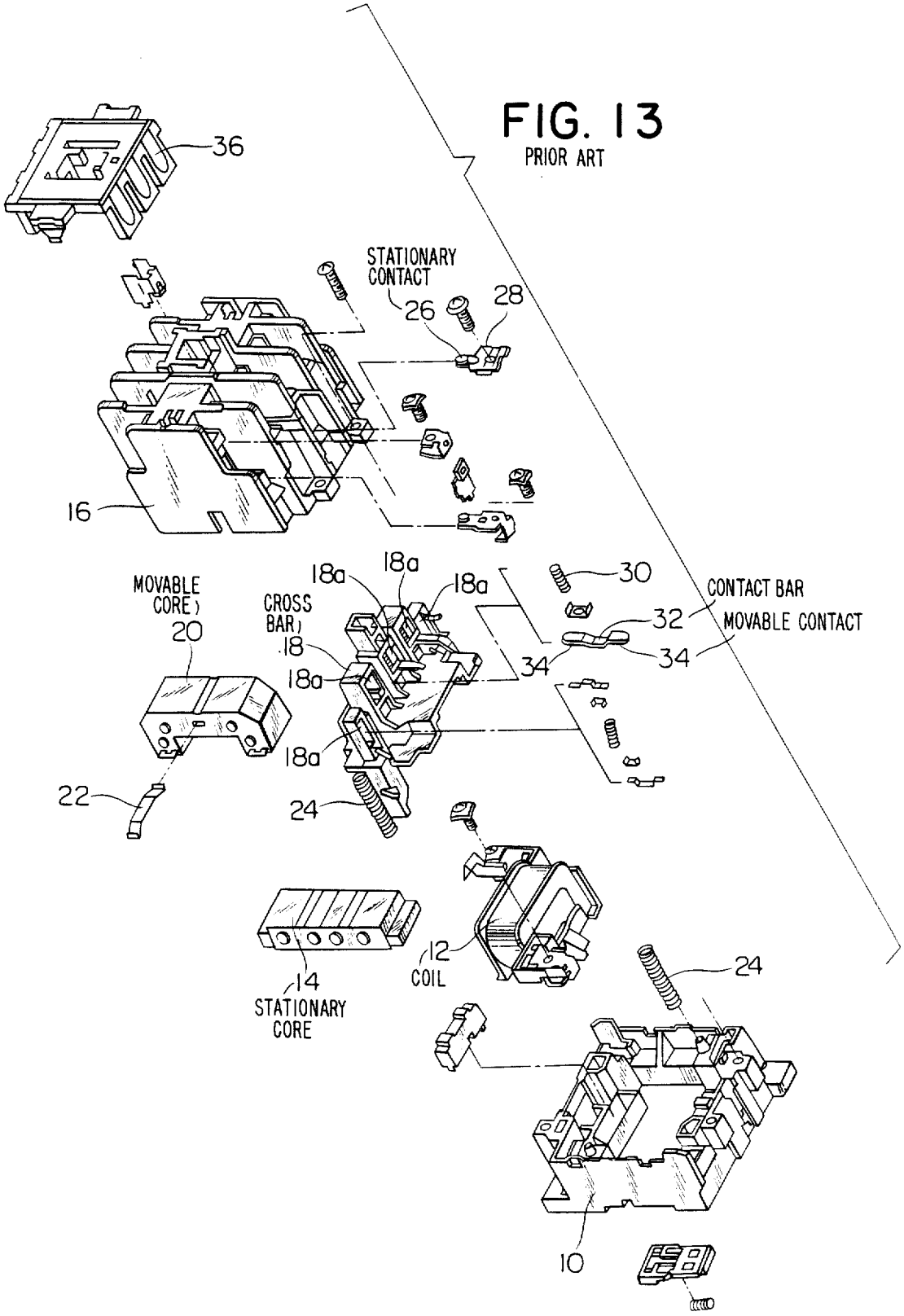
FIG. 13 PRIOR ART
FIG. 13 is an exploded perspective view of a conventional switch.
Figure 14:
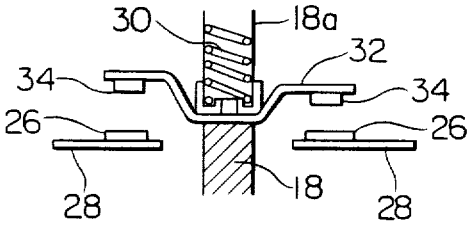
FIG. 14 is a longitudinal section through the cross bar and contacts of the switch shown in FIG. 13.

The embodiment of the invention to be described is a switch which in most respects is like that illustrated in FIG. 13 and described above. The difference, in accordance with the invention, concern the design and construction of the movable contact bar 32, and the opening 18a of the movable cross bar 18. Components of the switch that correspond to those shown in FIG. 13 are identified by the same reference numerals as in FIG. 13 and will not be described again.

Figure 1:
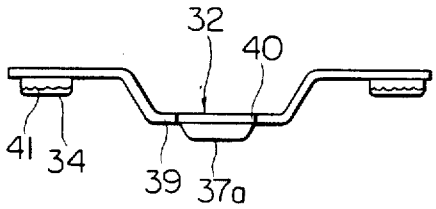
FIG. 1 is a side view of a contact bar of a switch embodying the invention.
Figure 2:
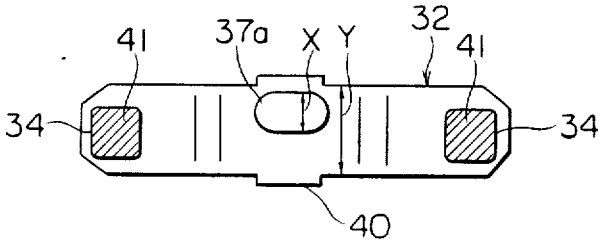
FIG. 2 is a plan view of the contact bar.
Figure 3:
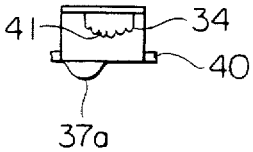
FIG. 3 is an end view of the contact bar.
Figure 4:
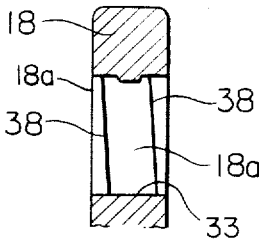
FIG. 4 is a longitudinal section through a portion of the cross bar.

The movable contact bar 32 shown in FIGS. 1 to 3 has a contact 34 at each end, and between these an offset central region 39 concave to the rear or upper side of the bar, so that the contacts 34 are set back relative to the central region 39. Each contact 34 is semi-cylindrical in cross section, in the direction of width of the contact bar 32. Each contact bar 34 has in its surface a plurality of wiping grooves 41, extending obliquely at an angle of about 45° to the center line of the bar 32.

The central region 39 is provided with a projection 37a, on the same face as the contacts 34, this projection being offset laterally from the center line of the bar 32. The projection 37a is semi circular, in cross section perpendicular to the length of the bar 32, and extends along an appreciable part of the length of the central region 39. Thus, as seen in FIG. 3, the contact bar 32 has an asymmetrical profile.

As in FIG. 13, the contact bar 32 extends through an opening 18a provided in the cross bar 18 as seen in FIGS. 4–10. One or each side wall of the opening 18a has a guide groove 38 extending along it. The guide groove 38 accommodates a corresponding lateral guide projection 40 provided on the central region of the contact bar 32. The guide groove 38 slants obliquely, relative to the longitudinal direction of the opening 18a and therefore relative to the direction of movement of the cross bar 18.

Instead of projections on the contact bar engaging oblique guide grooves in the cross bar, the contact bar may have lateral recesses engaging corresponding oblique longitudinal guide ribs at the sides of the cross bar opening 18a.

Figure 5:
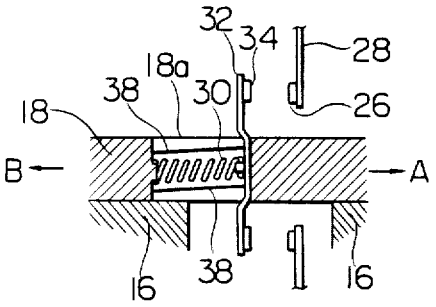
FIGS. 5 to 7 are section views similar to FIG. 4, showing a cross bar and fixed and movable contacts diagrammatically, in three different relative positions.
Figure 8:
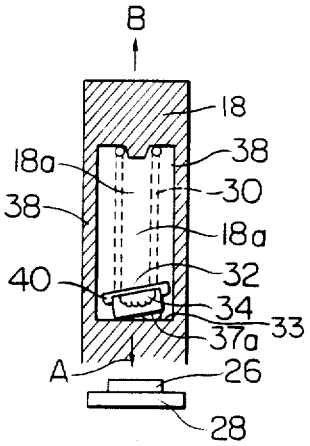
FIGS. 8 to 10 are longitudinal sections through the cross bar with the movable contact bar, movable contacts, and stationary contacts whoen diagrammatically in three different relative positions, on the line VIII—VIII of FIG. 11.

When the operating winding 12 of the switch is not energized, the cross bar and contacts are in the relative positions shown in FIGS. 5 and 8. The fixed and movable contacts 26, 34 are spaced apart, and the spring 30 holds the central region 39 of the contact bar 32 against the bottom surface 53 of the opening 18a. Because of the asymmetrical projection 37 resting against the bottom surface 33 of the opening 18a the contact bar 32 is tilted sideways, as shown in FIG. 8.

Figure 6:
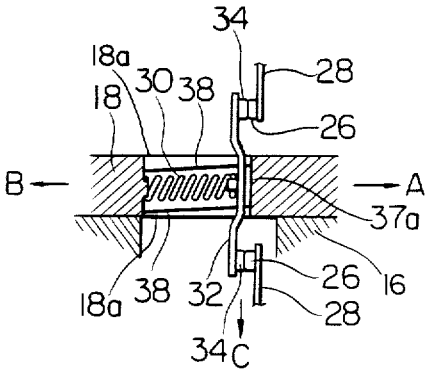
Figure 9:
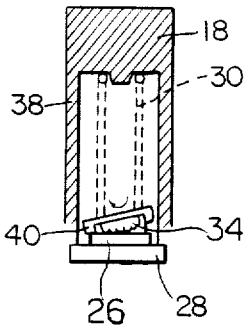

When the winding is energized, the cross bar 18 is moved towards it in the direction of the arrow A, so that the movable contacts 34 are brought into contact with the fixed contacts 26, see FIGS. 6 and 9.

After the fixed and movable contacts have met, the cross bar continues to move in the direction of the arrow A, so that the bottom surface 33 of the opening 18a is moved away from the contact bar 32 and the spring 30 is compressed between the bar 32 and the upper end of the opening 18a. As the lower end of the opening moves away from the projection 37, the bar 32 rotates about a longitudinal axis under the action of the spring 30, so that the movable contact 34 turns on the fixed contacts 26 until the bar 32, in cross section, is parallel to the fixed contact members 28 as in FIG. 10.

This rotation of the movable contacts 34 on the fixed contacts 26 produces a wiping action at the contact surfaces, whereby the contact surfaces are cleaned of surface oxide and contamination. The grooves in the moveable contacts 24 accentuate the surface cleaning action, and enable the removed material to be efficiently detacted and separated from the contact surfaces.

Figure 7:
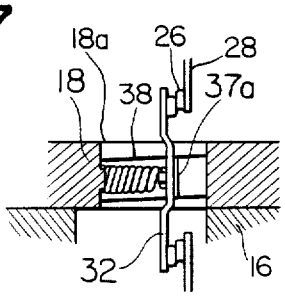
Figure 10:
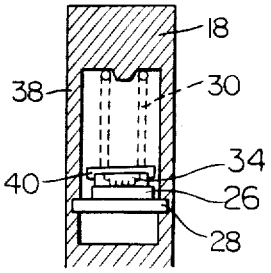
Figure 11:
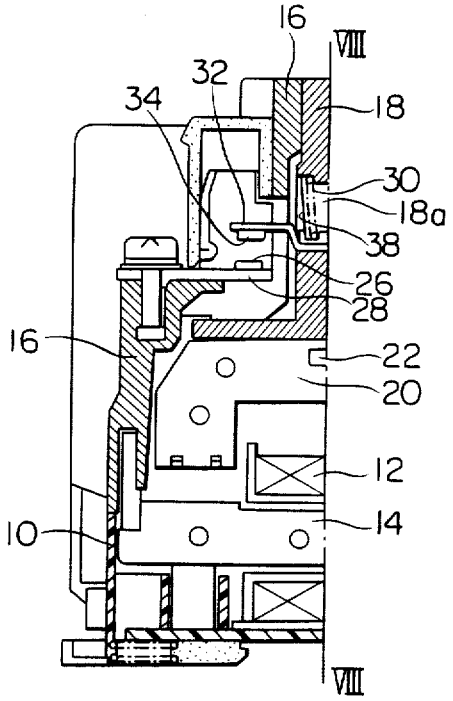
FIG. 11 is a partial section through a switch embodying the invention, on the line XI—XI of FIG. 12.
Figure 12:
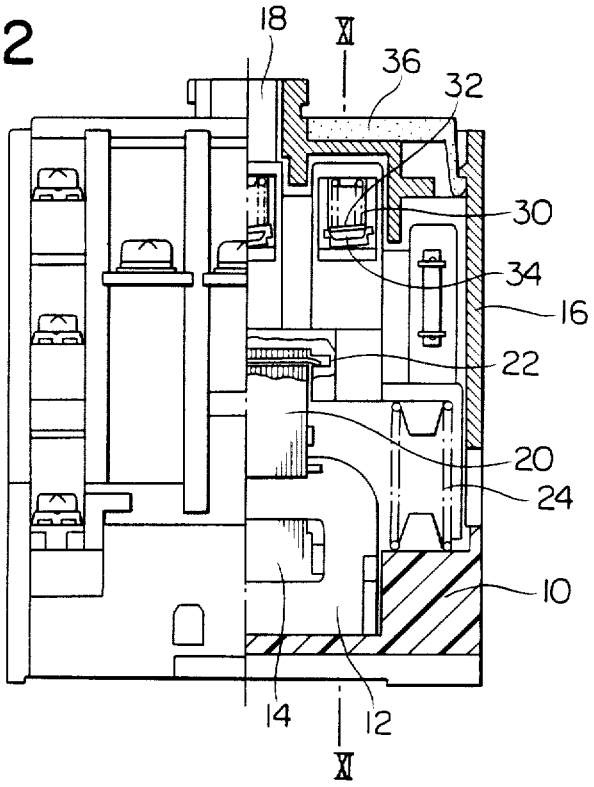
FIG. 12 is a partial section through the switch of the invention, on the line XII—XII of FIG. 11.

As the cross bar and contact bar move from the position shown in FIGS. 6 and 9 to the position shown in FIGS. 7 and 10, the guide grooves 38 move longitudinally relative to the contact bar 32 whose movement in the direction of the arrow A is stopped by the engagement of the movable contacts 34 with the fixed contacts 26. This longitudinal relative movement of the cross bar and contact bar, by virtue of the engagement of the projections 40 of the contact bar with the oblique guide grooves 38 of the cross bar, introduces a component of movement perpendicular to the direction of movement A of the cross bar, in the direction of the length of the contact bar 32 as shown by the arrow C. The contacts 34 are therefore made to slide on the contacts 26 in the longitudinal direction of the contact bar 32. This sliding also produces a wiping action (in a first direction) at the mating surfaces of the contacts, accentuated by the grooves in the contacts 34. Because these grooves extend obliquely relative to the longitudinal center line of the contact bar 32, they are effective for wiping both in rotation (FIGS. 9 and 10) and in sliding (FIGS. 6 and 7).

In general, the switch is installed so that the longer direction of the cross bar 18 is horizontal as in FIGS. 5 to 7. The longitudinal directions of the contact bar 32 and fixed contact members 28 are therefore vertical, and it is easy for oxide, dust and other surface contamination removed from the contact surfaces to drop clear of the contacts.

When the winding 12 is de-energized, the springs 24 move the cross bar 18 away from the winding so that the contacts open. Initially, as the cross bar moves in the direction of the arrow B, the interaction between the grooves 38 and projections 40 moves the contact bar 32 longitudinally so that the contacts 34 again slide on the contacts 26. When the end bottom surface 33 of the cross bar opening 18a meets the projection 37a, it causes the contact bar 32 to rotate about its longitudinal axis under the opposing force of the spring 30, causing the contacts 34 to rotate in contact with the fixed contacts 26 and producing a wiping action in a second direction generally perpendicular to the first direction. The moving cross bar 18 then lifts the contact bar 32 clear of the fixed contacts 26, in the tilted position shown in FIG. 8.

A switch according to the invention therefore has a double contact wiping action, comprising both rotation and sliding of the movable contacts, on the fixed contacts, with the curved path of the wiping action due to rotation between generally perpendicular to the straight path due to sliding of the contacts.

Figure 15:
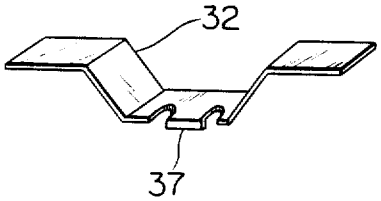
FIG. 15 shows a modification of the movable contact bar of the switch shown in FIGS. 13 and 14.

The described movable contact bar 32 has a number of advantages compared with the contact bars of conventional switchings. Because the projection 37a has a smooth convex profile, and a relatively large contact a rear with the bottom surface 33 of the cross bar opening 18a, wear at the contacting surface of the projection 37a and the cross bar is much reduced compared with, for example, switches incorporating contact bars as shown in FIG. 15. The life of the switch is therefore enhanced. The contact bar illustrated in FIGS. 1 to 3 is also easy to manufacture. The projection 37a can be produced by a simple pressing operation. If the width X of the projection 37a is more than about one third of the width Y of the contact bar 32, it becomes easy to feed the contact bar longitudinally in an automatic production line for assembly the switch; if X/Y is less than about one third, it is easy to feed the bar 32 longitudinally and transversely in an automatic production line. Therefore, the feed method for automatic production can be selected arbitrarily.

In the described embodiment the movable contacts 34 have curved cross sections and oblique wiping grooves 41. Alternatively, the curved profile and wiping grooves can be provided on the fixed contacts 26, or on both sets of contacts 26, 34.

What is claimed is:

1. A switch comprising:

a movable crossbar having an opening with side walls and a bottom surface;

an elongated movable contact member having movable contacts at each end, said movable contact member being arranged in the opening with a flat central portion abutting the bottom surface of the opening [;] *said movable contact member having a lengthwise center line,* a stationary contact member provided with stationary contacts disposed opposite the movable contacts;

*at least one of said contacts having at least one wiping groove which extends obliquely relative to a lengthwise direction of said movable contact member;* resilient means biasing said movable contact member toward the bottom surface of the opening and allowing said movable contact member to move in a direction generally parallel to the side walls toward and away from the bottom surface and the stationary contacts;

means for supporting said movable crossbar for movement in opposite directions so as to move said movable contact member toward and away from the stationary contacts for engaging and disengaging the contacts, respectively, said movable contact member being arranged in the opening with lost motion and resiliently biased relative to said movable crossbar toward the stationary contacts and toward the bottom surface of the opening whereby, on movement of the movable contact member toward the stationary contacts from an open contact position, the movable contacts engage the stationary contacts, on further movement of said movable crossbar to a closed contact position the bottom surface of the opening moves clear of said movable contact member, on movement of said movable crossbar from the closed contact position toward the open contact position, the bottom surface of the opening moves into abutment with said movable contact member, and, on further movement of said movable crossbar, the movable contacts are disengaged from the stationary contacts;

[sliding wiping action producing means including a guide projection and guide groove between a lateral edge of said movable contact member and a side wall of the opening and extending obliquely relative to the opposite directions of movement of the movable contact member for producing relative sliding movement in a lengthwise direction of said movable contact member between the movable and stationary contacts as the contacts are engaged and disengaged;] and rotary wiping action producing means including a projection laterally offset from the lengthwise center line of said movable contact member and between the central portion of said movable contact member and the bottom surface of the opening for rotating said movable contact member and producing a wiping movement along a curved path between the movable and stationary contacts in a direction generally perpendicular to the [direction of sliding movement between the contacts] *lengthwise center line* upon abutment between said movable contact member and the bottom surface of the opening as the movable contacts are disengaged from the stationary contacts, or as said movable contact member moves clear of the bottom surface as the movable contacts are engaged with the stationary contacts, [the engagement and disengagement of the contacts having a double wiping action comprising both rotation and sliding of the movable contacts on the stationary contacts with the curved path of the wiping action due to rotation being generally perpendicular to the straight path of the wiping action due to sliding of the movable contacts.] *said laterally offset projection being pressed from the flat central portion of said movable contact member and having a smooth convex profile and a semicircular cross-section.*

[2. A switch according to claim 1 wherein said laterally offset projection is pressed from the flat central portion of said movable contact member and has a smooth convex profile and a semi-circular cross section.]

[3. A switch according to claim 1 in which at least one contact has at least one wiping groove which extends obliquely relative to the lengthwise direction of the movable contact member.]

4. A switch according to claim [3] *1* wherein said at least one groove extends at an angle of about 45° to the lengthwise direction center line.

5. A switch according to claim 4 wherein at least one [contact] *of said movable contacts* has a semi-cylindrical cross section and a wiping groove in the face thereof.

6. A switch according to claim 5 [whereing] *wherein* the center part of [the] *said* movable contact member has a concave portion.

7. A switch as claimed in claim 1 in which at least one of the said movable contacts and stationary contacts has at least one contact-wiping groove.

8. A switch as claimed in claim 7 in which the at least one groove extends obliquely relative to the lengthwise center line of the moveable contact member.

9. A switch according to claim 1 wherein [said guide includes] oblique grooves *provided* in opposite side walls of the opening and said movable contact member is provided with lateral projections on side edges thereof engaging in the grooves for guiding the movable contact member in its movement in opposite directions for engaging and disengaging the movable and stationary contacts.

10. A switch comprising:

a movable crossbar having an opening with side walls and a bottom surface;

an elongated movable contact member having movable contacts at each end spaced substantially equally from a flat central portion of said movable contact member;

said movable contact member being arranged in the opening with said flat central portion abutting the bottom surface of the opening;

a stationary contact member provided with stationary contacts disposed opposite the movable contacts;

resilient means biasing said movable contact member toward the bottom surface of the opening and allowing said movable contact member to move in a direction generally parallel to the side walls toward and away form the bottom surface and the stationary contacts;

actuating means for moving said movable crossbar in opposite directions so as to move said movable contact member toward and away from the stationary contacts for engaging and disengaging the contacts, respectively, said movable contact member being arranged in the opening with lost motion and resiliently biased relative to said movable crossbar toward the stationary contacts and toward the bottom surface of the opening whereby, on movement of the movable contact member toward the stationary contacts from an open contact position, the movable contacts engage the stationary contacts, on further movement of said movable crossbar to a closed contact position the bottom surface of the opening moves clear of said movable contact member, on [movment] *movement* of said movable crossbar from the closed contact position toward the open contact position, the bottom surface of the opening moves into abutment with said movable contact member, and, on further movement of said movable crossbar, the movable contacts are disengaged from the stationary contacts;

sliding wiping action producing means including a guide projection and guide groove between a lateral edge of said movable contact member and a side wall of the opening and extending obliquely relative to the opposite directions of movement of the movable contact member for producing relative sliding movement in a lengthwise direction of said movable contact member between the movable and stationary contacts as the contacts are engaged and disengaged; and rotary wiping action producing means including a projection laterally offset from the lengthwise center line of said movable contact member and between the central portion of said movable contact member and the bottom surface of the opening for rotating said movable contact member and producing a wiping movement along a curved path between the movable and stationary contacts in a direction generally perpendicular to the direction of sliding movement between the contacts upon abutment between said movable contact member and the bottom surface of the opening as the movable contacts are disengaged from the stationary contacts, or as said movable contact member moves clear of the bottom surface as the movable contacts are engaged with the stationary contacts, the engagement and disengagement of the contacts having a double wiping action comprising both rotation and sliding of the movable contacts on the stationary contacts with the curved path of the wiping action due to rotation being generally perpendicular to the straight path of the wiping action due to sliding of the movable contacts.

* * * * *